US012762907B2

(12) United States Patent
Borhan

(10) Patent No.: US 12,762,907 B2
(45) Date of Patent: Oct. 13, 2026

(54) SYSTEMS AND METHODS FOR PREDICTIVE LANE CHANGE

(71) Applicant: Cummins Inc., Columbus, IN (US)

(72) Inventor: Hoseinali Borhan, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 80 days.

(21) Appl. No.: 18/787,860

(22) Filed: Jul. 29, 2024

(65) Prior Publication Data

US 2024/0386759 A1 Nov. 21, 2024

Related U.S. Application Data

(63) Continuation of application No. 17/403,189, filed on Aug. 16, 2021, now Pat. No. 12,080,111.

(51) Int. Cl.

| | |
|---|---|
| ***B60K 35/10*** | (2024.01) |
| ***B60K 35/28*** | (2024.01) |
| ***G07C 5/06*** | (2006.01) |
| *B60K 35/23* | (2024.01) |
| *B60K 35/25* | (2024.01) |
| *B60K 35/85* | (2024.01) |
| *B60K 35/90* | (2024.01) |

(52) U.S. Cl.

CPC ................ *G07C 5/06* (2013.01); *B60K 35/10* (2024.01); *B60K 35/28* (2024.01); *B60K 35/23* (2024.01); *B60K 35/25* (2024.01); *B60K 35/85* (2024.01); *B60K 35/90* (2024.01); *B60K 2360/161* (2024.01)

(58) Field of Classification Search

CPC .......... G07C 5/06; B60K 35/28; B60K 35/10; B60K 35/23; B60K 2360/161; B60K 35/85; B60K 35/25; B60K 35/90

See application file for complete search history.

(56) References Cited

U.S. PATENT DOCUMENTS

| | | | |
|---|---|---|---|
| 9,421,979 | B2 | 8/2016 | Szwabowski et al. |
| 9,625,910 | B2 | 4/2017 | Choi et al. |
| 10,156,846 | B2 | 12/2018 | Choi et al. |

(Continued)

FOREIGN PATENT DOCUMENTS

| | | |
|---|---|---|
| GB | 2 560 244 | 9/2018 |
| WO | WO-2014/152554 A1 | 9/2014 |

(Continued)

OTHER PUBLICATIONS

Notice of Allowance on U.S. Appl. No. 17/403,189 Dtd Apr. 30, 2024.

(Continued)

*Primary Examiner* — Mathew Franklin Gordon
(74) *Attorney, Agent, or Firm* — Foley & Lardner LLP

(57) ABSTRACT

A method includes: receiving information indicative of operation of a vehicle and of a driving condition for the vehicle; determining a slowdown event of the vehicle within a predefined time period or distance based on the received information; determining, in response to the determination of the slowdown event within the predefined time period or distance; that a takeover event is feasible based on the received information; and, initiating the takeover event in response to the determination that the takeover event is feasible.

17 Claims, 6 Drawing Sheets

(56) References Cited

U.S. PATENT DOCUMENTS

| | | | | | |
|---|---|---|---|---|---|
| 10,773,727 | B1 * | 9/2020 | Ivanyi | B60K 35/10 |
| 2011/0130936 | A1 * | 6/2011 | Noda | G08G 1/167 |
| | | | | 701/70 |
| 2020/0066160 | A1 * | 2/2020 | Mishina | G08G 1/167 |
| 2021/0229571 | A1 * | 7/2021 | Shimakami | B60W 50/14 |

FOREIGN PATENT DOCUMENTS

| | | |
|---|---|---|
| WO | WO-2015/134421 A1 | 9/2015 |
| WO | WO-2020/139814 | 7/2020 |

OTHER PUBLICATIONS

SAE International, "Surface Vehicle Recommended Practice: J3016", Jan. 2014, revised Jun. 2018, 35 pages.

* cited by examiner

SYSTEMS AND METHODS FOR PREDICTIVE LANE CHANGE

CROSS-REFERENCE TO RELATED APPLICATION

This application is a Continuation of U.S. patent application Ser. No. 17/403,189, filed Aug. 16, 2021, which is incorporated herein by reference in its entirety.

STATEMENT REGARDING FEDERALLY SPONSORED RESEARCH OR DEVELOPMENT

This invention was made with Government support under DE-EE0008469 awarded by the Department of Energy (DOE). The Government has certain rights in this invention.

TECHNICAL FIELD

The present disclosure relates to systems and methods for determining the feasibility and efficiency of a lane change and/or takeover event/maneuver for a vehicle.

BACKGROUND

Route look-ahead systems are used to identify certain characteristics ahead of a vehicle, such as road grade and speed limits. With this forward looking information, operation of the vehicle may be planned/controlled for certain events (e.g., an upcoming uphill or downhill event) in order to achieve various benefits, such as improving fuel efficiency. For example, a route look-ahead system may determine an upcoming downhill portion of the route and indicate to the driver to reduce the vehicle speed earlier than the driver normally would because the vehicle speed will be maintained given the upcoming downhill grade. However, such route look-ahead systems traditionally do not provide information regarding dynamic characteristics ahead of the vehicle as well as the dynamic operating constraints of the subsystems of the vehicle and, therefore, such systems do not provide a comprehensive solution to, for example, optimizing one or more vehicle operating parameters, such as vehicle fuel efficiency.

SUMMARY

One embodiment relates to a method for evaluating a lane change and takeover event for a vehicle, the method comprising: receiving, by a controller, information indicative of operation of the vehicle and of a driving condition for the vehicle; determining, by the controller, that a speed of the vehicle is less than a target speed for the vehicle based on the received information; determining, by the controller and in response to the determination that the speed is less than the target speed, that the lane change and takeover event is feasible based on the received information; and providing, by the controller and in response to the determination regarding the lane change and takeover event, a notification.

Another embodiment relates to a method for evaluating a lane change and takeover event for a vehicle, the method comprising: receiving, by a controller, information indicative of operation of the vehicle and of a driving condition for the vehicle; determining, by the controller, that a speed of the vehicle is less than a target speed for the vehicle based on the received information; determining, by the controller and in response to the determination that the speed is less than the target speed, that the lane change and takeover event is efficient based on the received information; and providing, by the controller and in response to the determination regarding the lane change and takeover event, a notification.

Another embodiment relates to a system that includes a controller comprising at least one processor coupled to a memory storing instructions that, when executed by the at least one processor, cause the controller to perform operations comprising: receiving information indicative of operation of the vehicle and of driving conditions for the vehicle; determining that a speed of the vehicle is less than a target speed for the vehicle based on the received information; determining, in response to the determination that the speed is less than the target speed, that the lane change and takeover event is at least one of feasible or efficient based on the received information; and providing, in response to the determination regarding the lane change and takeover event, a notification This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
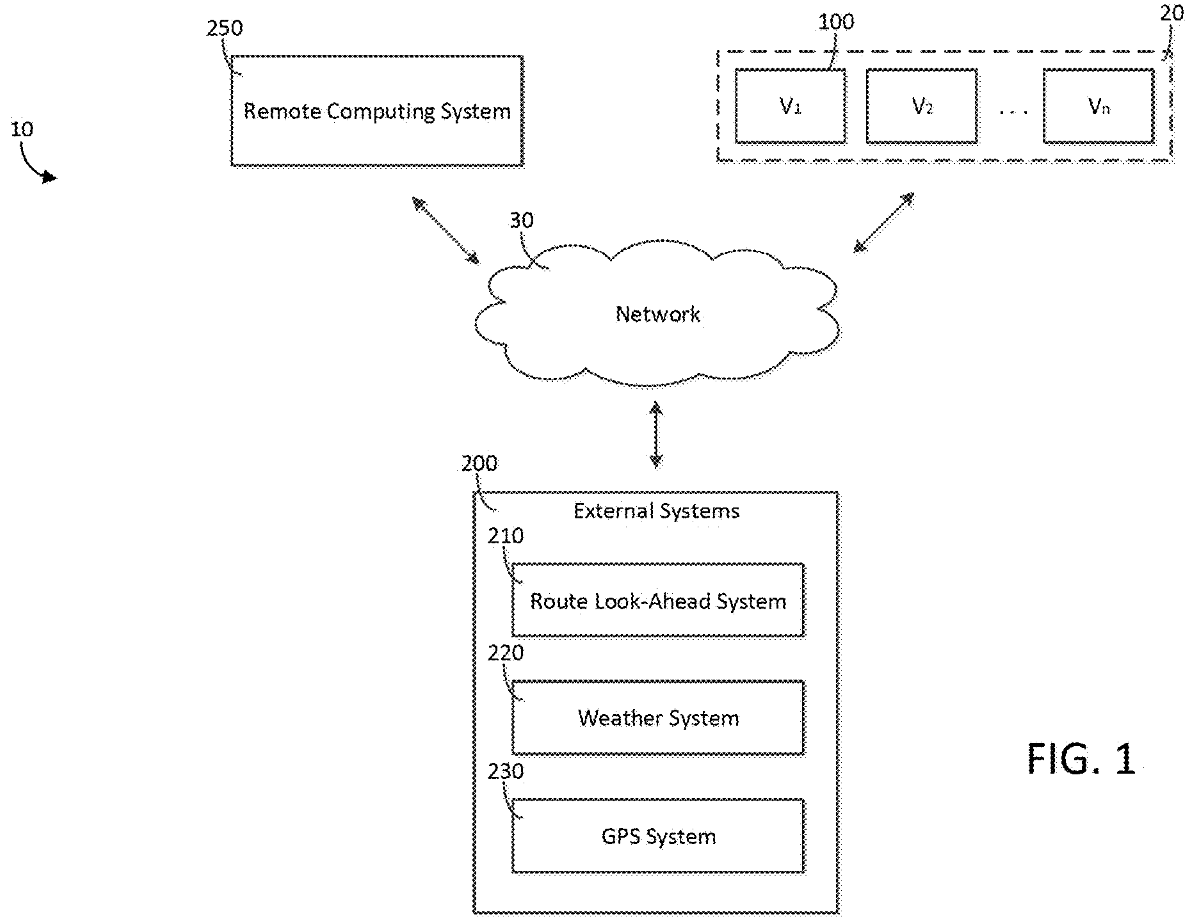
FIG. 1 is a schematic diagram of a networked vehicle environment, shown as an intelligent transportation system, according to an example embodiment.

Following below are more detailed descriptions of various concepts related to, and implementations of, methods, apparatuses, and systems for determining the feasibility and efficiency of a lane change and takeover event/maneuver for a vehicle. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Generally speaking, in non-autonomous driving systems, a decision to initiate a lane change event is a mental process performed by a driver, who estimates (or outright guesses) whether the lane change event would be successful based on a visual assessment of any vehicle(s) in front of the driver and of the upcoming stretch of road. However, not only is this mental process unlikely to be accurate, it is often based on incomplete data, as the driver cannot gauge road conditions beyond the driver's field of vision, which could be extremely limited. Conventional autonomous driving systems (ADS) feature lane change commands that are requested from a behavioral layer of the ADS control system. For example, if the ADS control system senses that the vehicle is slowing down due to a slow driving car based on the driver switching from a cruise control operating mode to a manual driving mode, the ADS control system may request a lane change. However, because the ADS control system is generally ignorant of conditions beyond vehicle speed and the immediate surroundings, conventional ADS control systems may request lane changes at inopportune times. If the lane change is requested prior to an uphill portion of the route, the vehicle is slowed during the lane change event and may no longer be able to successfully pass the vehicle in front of them. This is particularly true for trucks or other heavy-haul vehicles, as the higher weight of cargo causes drastic speed decreases on uphill portions of a route. If the vehicle is unable to pass, it is forced to return to the original lane, having wasted the additional fuel from the failed lane change event.

Referring to the Figures generally, the various embodiments disclosed herein relate to systems, apparatuses, and methods for utilizing look-ahead road grade data in order to recommend or initiate lane change events. In operation, a controller determines, based on an operation status of the vehicle, that the vehicle has slowed beyond a target speed and that a lane change and takeover event is desired. From there, the controller determines a takeover speed necessary for a successful lane change and takeover event, and determines whether the vehicle can achieve that takeover speed based in part on the look-ahead road grade data. If so, the controller provides a notification to the driver that a lane change and takeover event is feasible.

Technically and beneficially, by factoring in look-ahead data, particularly road grade data, and a dynamic communication system connected to other vehicles and/or remote locations (e.g., a fleet control center), the systems, methods, and apparatuses described herein determine in real-time whether a lane change event would be feasible and/or efficient, such that a driver no longer has to guess or decide to implement the lane change based on potentially inaccurate visual data. Furthermore, by identifying one or more priorities or goals for the system (e.g., improved fuel efficiency, lower emissions), the systems, methods, and apparatuses described herein provide tailored recommendations, such that the determination that a driver should initiate a lane change event is made in view of a particular goal in mind (e.g., greater fuel-efficiency). The present systems and methods also provide more integrated and seamless guidance to a driver by recommending lane-change events through visual feedback (e.g., an indicator light on the dashboard) and/or haptic feedback (e.g., vibration of the steering wheel or seat). In addition, the system may also issue commands to vehicle components to improve the lane change and takeover event, such as a command to increase fueling, which would reduce any lag or delay for the vehicle to achieve a takeover speed.

Referring now to FIG. 1, an intelligent communication and vehicle control system 10 is shown, according to an example embodiment. The system 10 includes a fleet of one or more vehicles 20, a network 30, one or more external systems 200, and a remote computing system 250. The fleet of one or more vehicles 20 includes a vehicle 100. The vehicle control system 10 is structured to provide an environment that facilitates and allows the exchange of information or data (e.g., communications) between a vehicle, such as vehicle 100, and one or more other components or other vehicles, such as the fleet of one or more vehicles 20. In this regard and for example, the vehicle control system 10 may include telematics systems that facilitate the acquisition and transmission of data acquired regarding the operation of the vehicle 100.

According to an example embodiment, the network 30 wirelessly communicably couples the remote computing system 250 to the vehicles 20 and the external systems 200. In an alternative embodiment, one or more of the external systems 200 are integrated into the remote computing system 250. The remote computing system 250 may be a computing system or device that includes one or more processing circuits, network interfaces, and other computing systems and devices that couple to the network 30 and enables the exchange of information between the remote information source and the controller 140. Thus, the remote computing system 250 may be a source of information that is remote from the vehicle 100 and include one or more of another vehicle, a remote server/computing system (e.g., a fleet operator and its computing system), a mobile computing device (e.g., mobile phone, tablet computer, desktop computer, etc.). Thus, the controller 140 may form a V-2-X relationship with the remote information sources 270, where "X" can be another vehicle, a remote server, etc.

As shown in FIG. 1, the external systems 200 include a route look-ahead system 210, a weather system 220, and a global positioning satellite (GPS) system 230. In some embodiments, the external systems 200 include fewer, more, or different systems. The route look-ahead system 210 may be a remote computing system that is structured to acquire route look-ahead data including static information indicative of road parameters ahead of a respective vehicle 100. The road parameters may include information regarding road function class (e.g., freeway/interstate, arterial roads, collectors, local roads, unclassified roads, etc.), speed limits, road grade, road slope, road curvature, bridges, fuel stations, number of lanes, and the like.

The weather system 220 may be a remote computing system that is structured to acquire weather data including dynamic information indicative of weather conditions ahead of the respective vehicle 100. The weather conditions may include information indicative of road surface conditions (e.g., wet, icy, snowy, dry, etc.) and/or weather (e.g., rain, snow, temperature, humidity, etc.) ahead of the respective vehicle 100.

The GPS system 230 may be a remote computing system that is structured to (i) receive information regarding a current location and a desired destination of a respective vehicle and (ii) generate GPS data that facilitates determining one or more routes from the current location and the desired destination. In some embodiments, a route of the vehicle 100 is predicted by extrapolating a current location of the vehicle 100 relative a finite distance ahead of the vehicle 100 (e.g., the system assumes the vehicle 100 will continue traveling on the road the vehicle is currently on if there are no roads to turn onto for X distance).

Figure 2:
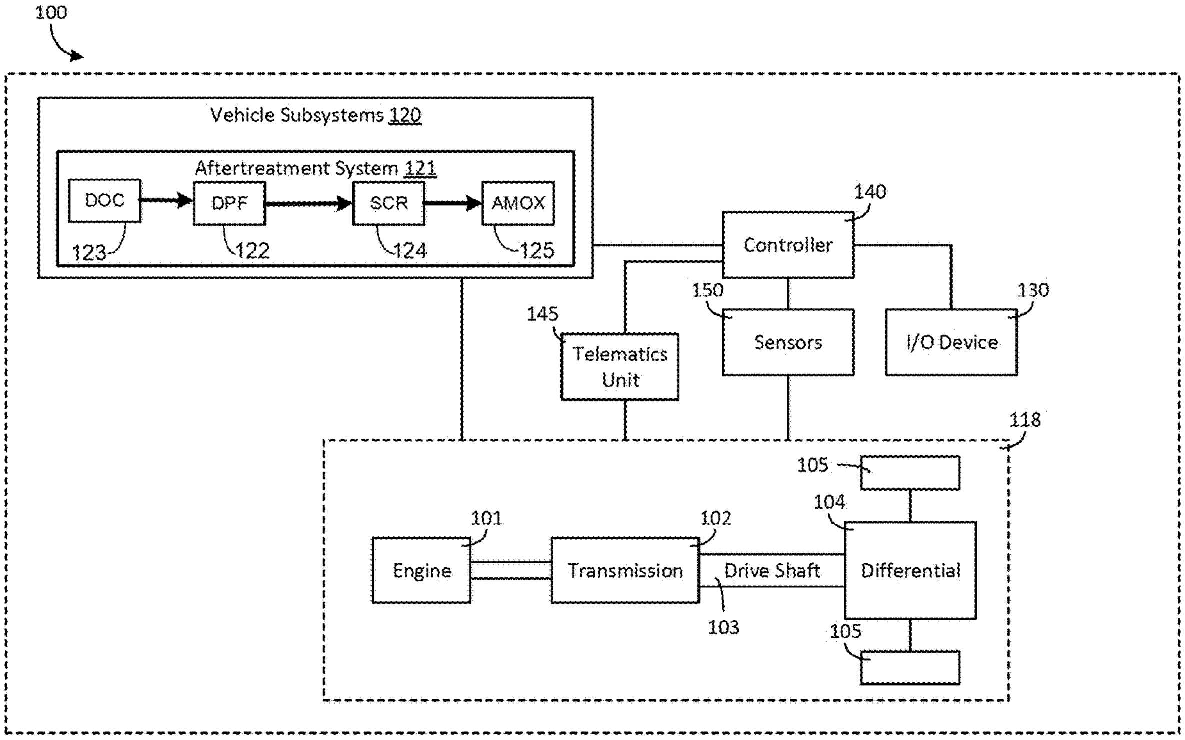
FIG. 2 is a schematic diagram of a vehicle of the system of FIG. 1, according to an example embodiment.

Referring now to FIG. 2, the vehicle 100 includes a powertrain system 110, vehicle subsystems 120, operator input/output (I/O) device 130, a controller 140, and a telematics unit 145, where the controller 140 is communicably coupled to each of the aforementioned components. The powertrain system includes an engine 101 and a transmission 102. The transmission 102 is operatively coupled to a drive shaft 103, which is operatively coupled to a differential 104, where the differential 104 transfers power output from the engine 101 to the final drive 105 to propel the vehicle 100. The vehicle 100 may be any type of on-road or off-road vehicle including, but not limited to, road sweeper vehicles, road sprinkler vehicles, refuse transfer vehicles, wheel-loaders, fork-lift trucks, line-haul trucks, mid-range trucks (e.g., pick-up truck, etc.), sedans, coupes, tanks, airplanes, boats, and any other type of vehicle The engine 101 is an internal combustion engine (e.g., compression-ignition or spark-ignition), such that it can be powered by any fuel type (e.g., diesel, ethanol, gasoline, etc.). The engine 101 includes one or more cylinders and associated pistons. In the example shown, the engine 101 is a diesel powered compression-ignition engine. Air from the atmosphere is combined with fuel, and combusted, to produce power for the vehicle. Combustion of the fuel and air in the compression chambers of the engine 101 produces exhaust gas that is operatively vented to an exhaust pipe and to the exhaust aftertreatment system.

The transmission 102 may be structured as any type of transmission, such as a continuous variable transmission, a manual transmission, an automatic transmission, an automatic-manual transmission, a dual clutch transmission, and so on. Accordingly, as transmissions vary from geared to continuous configurations (e.g., continuous variable transmission), the transmission 102 may include a variety of settings (gears, for a geared transmission) that affect different output speeds based on an input speed received thereby. Like the engine 101 and the transmission 102, the driveshaft 103, the differential 104, and/or the final drive 105 may be structured in any configuration dependent on the application (e.g., the final drive 105 is structured as wheels in an automotive application and a propeller in a boat application, etc.). Further, the driveshaft 103 may be structured as any type of driveshaft including, but not limited to, a one-piece, two-piece, and a slip-in-tube driveshaft based on the application.

In some embodiments, the vehicle subsystems 120 may include components including mechanically driven or electrically driven vehicle components (e.g., HVAC system, lights, pumps, fans, etc.). The vehicle subsystems 120 may also include an exhaust aftertreatment system in exhaust-gas receiving communication with the engine 101. The aftertreatment system 121 includes a diesel particulate filter (DPF) 122, a diesel oxidation catalyst (DOC) 123, a selective catalytic reduction (SCR) system 124, and an ammonia slip catalyst (ASC) 125. The DOC 123 is structured to receive the exhaust gas from the engine 101 and to oxidize hydrocarbons and carbon monoxide in the exhaust gas. The DPF 122 is arranged or positioned downstream of the DOC 123 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some implementations, the DPF 122 or other components may be omitted. Additionally, although a particular arrangement is shown for the aftertreatment system 121 in FIG. 2, the arrangement of components within the aftertreatment system 121 may be different in other embodiments (e.g., the DPF 122 positioned downstream of the SCR 124 and ASC 125, one or more components omitted or added, etc.).

The aftertreatment system 121 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR 124 generally (or in particular, the SCR catalyst) by a DEF doser such that the SCR catalyst receives a mixture of the reductant and exhaust gas. The reductant droplets then undergo the processes of evaporation, thermolysis, and hydrolysis to form gaseous ammonia within the decomposition chamber, the SCR catalyst, and/or the exhaust gas conduit system, which leaves the aftertreatment system 121. The aftertreatment system 121 may further include an oxidation catalyst (e.g., the DOC 123) fluidly coupled to the exhaust gas conduit system to oxidize hydrocarbons and carbon monoxide in the exhaust gas. In order to properly assist in this reduction, the DOC 123 may be required to be at a certain operating temperature. In some embodiments, this certain operating temperature is approximately between 200-500° C. In other embodiments, the certain operating temperature is the temperature at which the conversion efficiency of the DOC 123 exceeds a predefined threshold (e.g. the conversion of HC to less harmful compounds, which is known as the HC conversion efficiency).

The SCR 124 is configured to assist in the reduction of NOx emissions by accelerating a NOx reduction process between the ammonia and the NOx of the exhaust gas into diatomic nitrogen and water. If the SCR catalyst is not at or above a certain temperature, the acceleration of the NOx reduction process is limited and the SCR 124 may not be operating at a level of efficiency to meet regulations. In some embodiments, this certain temperature is approximately 200-600° C. The SCR catalyst may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.).

When ammonia in the exhaust gas does not react with the SCR catalyst (either because the SCR 124 is below operating temperature or because the amount of dosed ammonia greatly exceeds the amount of NOx), the unreacted ammonia may bind to the SCR catalyst, becoming stored in the SCR 124. This stored ammonia is released from the SCR 124 as the SCR 124 warms, which can cause issues if the amount of ammonia released is greater than the amount of NOx passing through (i.e., more ammonia than needed for the amount of NOx, which can lead to ammonia slip). In some embodiments, the ASC 125 is included and structured to address ammonia slip by removing at least some excess ammonia from the treated exhaust gas before the treated exhaust is released into the atmosphere. As exhaust gas passes through the ASC 125, some of unreacted ammonia (i.e., unreacted with NOx) remaining in the exhaust gas is partially oxidized to NOx, which then consequently reacts with the remaining unreacted ammonia to form $N_2$ gas and water. However, similar to the SCR catalyst, if the ASC 125 is not at or above a certain temperature, the acceleration of the $NH_3$ oxidization process is limited and the ASC 125 may not be operating at a level of efficiency to meet regulations or desired parameters. In some embodiments, this certain temperature is approximately 250-300° C.

Referring still to FIG. 2, an operator input/output (I/O) device 130 is also shown. The operator I/O device 130 may be coupled to the controller 140, such that information may be exchanged between the controller 140 and the I/O device 130, wherein the information may relate to one or more components of FIG. 1 or determinations (described below)

of the controller 140. The operator I/O device 130 enables an operator of the vehicle 100 to communicate with the controller 140 and one or more components of the system 10 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

As discussed herein, the system 10 may include an automated driving system (ADS) that may control various functionalities of the vehicle 100. In this way and consistent with SAE J3016 (see SAE J3016, dated June 2018, and titled *Taxonomy and Definitions for Terms Related to Driving Automation Systems for On-Road Motor Vehicles*, which is incorporated herein by reference in its entirety) there may be five levels of automation. Depending on the configuration and the ADS, the ADS may enable up to a level 5 of automation, which enables full automated driving. Level 0 provides for no driving automation, Level 1 provides for some driver assistance, Level 2 provides for partial driving automation, Level 3 provides for conditional driving automation, Level 4 provides for high driving automation, and Level 5 (the highest level) provides for full driving automation. The systems, methods, and apparatuses described herein are applicable with Level 1 through Level 5 and, preferably, with Level 3 through Level 5 automation. Thus, the ADS may enable at least a Level 1, and preferably, a minimum of a Level 3 of automation of the vehicle 100.

Thus and depending on the level of automation, the ADS may, for example, initiate a lane change and takeover event automatically without input from a human driver, control gear shifting of the transmission 102, apply a braking system, engage an auxiliary brake, etc. The ADS can include one or more automated vehicular systems within an otherwise manually operated vehicle, such as an automatically shifted transmission. In another configuration, the ADS refers to the components and systems to provide a Level 1 and up (e.g., Level 1, 2, 3, 4 and/or 5) ADS comprised of many individual vehicular systems that are automatically controlled. As mentioned above and in one embodiment, the ADS may initiate a lane change and takeover event by adjusting a position of the wheels (e.g., by issuing a command to the wheels directly, by issuing a command to turn a steering wheel connected to the final drive 105) and by adjusting a speed of the vehicle 100. The ADS may adjust a speed of the vehicle 100 by increasing a power demand on the engine 101, increasing a fueling quantity to the engine 101, or by automatically depressing the accelerator pedal.

As the components of FIG. 2 are shown to be embodied in the vehicle 100, the controller 140 may be structured as one or more electronic control units (ECU). The function and structure of the controller 140 is described in greater detail in FIG. 3. The controller 140 may be separate from or included with at least one of a transmission control unit, an exhaust aftertreatment control unit, a powertrain control module, an engine control module, etc. The function and structure of the controller 140 is described in greater detail in FIG. 3. In one embodiment, the components of the controller 140 are combined into a single unit. In another embodiment, one or more of the components may be geographically dispersed throughout the system or vehicle. In this regard, various components of the controller 104, discussed below, may be dispersed in separate physical locations of the vehicle 100.

The vehicle 100 is also shown to include a telematics unit 145. The telematics unit 145 may be structured as any type of telematics control unit. Accordingly, the telematics unit 145 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 145 and one or more remote devices (e.g., a provider/manufacturer of the telematics device, etc.). In this regard, the communications interface may be configured as any type of mobile communications interface or protocol including, but not limited to, Wi-Fi, WiMAX, Internet, Radio, Bluetooth, Zigbee, satellite, radio, Cellular, GSM, GPRS, LTE, and the like. The telematics unit 145 may also include a communications interface for communicating with the controller 140 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 140 and the telematics unit 145. In other embodiments, a local area network (LAN), a wide area network (WAN), or an external computer (for example, through the Internet using an Internet Service Provider) may provide, facilitate, and support communication between the telematics unit 145 and the controller 140. In still another embodiment, the communication between the telematics unit 145 and the controller 140 is via the unified diagnostic services (UDS) protocol. All such variations are intended to fall within the spirit and scope of the present disclosure.

Still referring to FIG. 2, as also shown, sensors 150 are included in the vehicle 100. The sensors are coupled to the controller 140, such that the controller 140 can monitor and acquire data indicative of operation of the vehicle 100. The sensors 150 may include sensors positioned and/or structured to monitor operating characteristics or parameters of various components of the vehicle 100. By way of example, the sensors 150 may include a position sensor structured to facilitate monitoring the position of the accelerator (e.g., accelerator pedal, accelerator throttle, etc.) and/or the brake (e.g., brake pedal, brake lever, etc.) of the vehicle 100. The sensors 150 may include a speed sensor structured to facilitate monitoring and/or acquire data indicative of a speed of the vehicle 100 and/or the engine 101 speed that may be used to determine the speed of the vehicle 100. The sensors 150 may include aftertreatment sensors (e.g., NOx sensors, temperature sensors, etc.) structured to acquire data/information indicative of and/or monitor the temperature of components of the exhaust aftertreatment system, the temperature of the exhaust gases, and/or the composition of the exhaust gasses. The sensors 150 may include sensors structured to acquire data indicative of a torque and/or power output of the primary driver (e.g., the engine 101). The sensors 150 may also include sensors structured to facilitate determining a current transmission gear selection of the transmission 102.

As discussed herein, "fuel efficiency" refers to a rate of fuel consumption (e.g., how well the vehicle or system uses the inputted fuel). As such, fuel efficiency may be measured using one or more parameters indicative of a rate of fuel consumption, such as a flat measurement of the rate at which fuel is input into the engine 101, or an amount of distance traveled as a function of fueling rate. Alternatively, brake thermal efficiency (BTE) may be used to track fuel efficiency. Although BTE does not directly indicate fuel consumption, by providing a ratio of an amount of actual power applied to the final drive to an amount of total amount of energy generated by burned fuel, the BTE provides a picture of how well (or poorly) the engine 101 is utilizing the energy from the fuel. Relatively poor utilization of the fuel energy leads to poor fuel efficiency because the engine 101 is burning more fuel in order to generate the actual power for the final drive, while relatively good utilization of the fuel energy leads to good fuel efficiency. Good fuel efficiency is defined as a value for fuel efficiency at which the engine 101 is producing a relative high amount of fuel energy per unit of fuel. Due to differences in engine and engine load, a value for good fuel efficiency may not be universally defined across all engines but depends on the particular engine, load, and/or duty cycle.

The controller 140 is structured to control, at least partly, the operation of the vehicle 100 and associated sub-systems, such as the engine 101, the operator input/output (I/O) device 130, and the aftertreatment system 121. In particular for the aftertreatment system 121, the controller 140 is structured to control one or more components of the aftertreatment system 121 in order to achieve certain values for operating parameters. For example, the controller 140 may control a heater or DEF doser of the aftertreatment system 121 in order to increase a conversion efficiency of the SCR 124 to achieve a particular value for NOx output. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIGS. 1-2, the controller 140 is structured to receive data from one or more of the components shown in FIG. 1. The structure and function of the controller 140 is further described in regard to FIG. 3.

Figure 3:
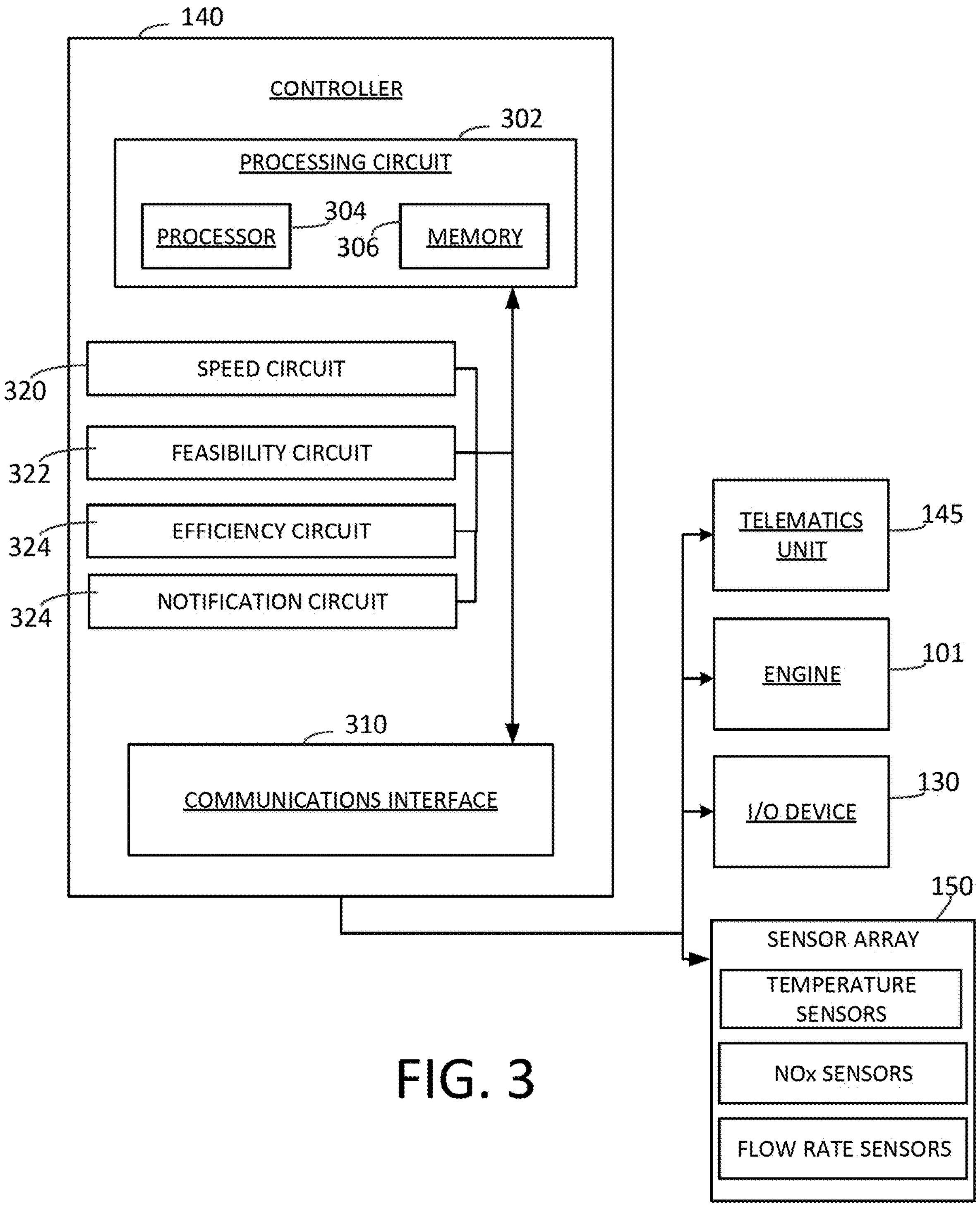
FIG. 3 is a schematic diagram of the controller of FIG. 2, according to an example embodiment.

Referring now to FIG. 3, a schematic diagram of the controller 140 of the vehicle 100 of FIG. 2 along with certain other systems, is shown according to an example embodiment. As shown in FIG. 3, the controller 140 includes a processing circuit 302 having a processor 304 and a memory 306, a speed circuit 320, a feasibility circuit 322, an efficiency circuit 324, a notification circuit 326, and a communications interface 310. The controller 140 is configured or structured to receive information regarding operation of the vehicle 100 and of current and upcoming road conditions, and to determine if a lane change and takeover event is feasible and/or efficient in response to determining that the vehicle 100 is travelling more slowly than a target speed. The controller 140 is configured or structured to then notify a driver of the vehicle 100 regarding the feasibility and/or efficiency of a lane change and takeover event, either immediate or delayed.

In one configuration, the speed circuit 320, the feasibility circuit 322, the efficiency circuit 324, and the notification circuit 326 are embodied as machine or computer-readable media storing instructions that are executable by a processor, such as processor 304. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the speed circuit 320, the feasibility circuit 322, the efficiency circuit 324, and the notification circuit 326 are embodied as hardware units, such as electronic control units. As such, the speed circuit 320, the feasibility circuit 322, the efficiency circuit 324, and the notification circuit 326 may be embodied as one or more circuitry components including, but not limited to, processing circuitry, network interfaces, peripheral devices, input devices, output devices, sensors, etc. In some embodiments, the speed circuit 320, the feasibility circuit 322, the efficiency circuit 324, and the notification circuit 326 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the speed circuit 320, the feasibility circuit 322, the efficiency circuit 324, and the notification circuit 326 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The speed circuit 320, the feasibility circuit 322, the efficiency circuit 324, and the notification circuit 326 may also include programmable hardware devices such as field programmable gate arrays, programmable array logic, programmable logic devices or the like. The speed circuit 320, the feasibility circuit 322, the efficiency circuit 324, and the notification circuit 326 may include one or more memory devices for storing instructions that are executable by the processor(s) of the speed circuit 320, the feasibility circuit 322, the efficiency circuit 324, and the notification circuit 326. The one or more memory devices and processor(s) may have the same definition as provided below with respect to the memory 306 and processor 304. In some hardware unit configurations and as alluded to above, the speed circuit 320, the feasibility circuit 322, the efficiency circuit 324, and the notification circuit 326 may be geographically dispersed throughout separate locations in the vehicle. Alternatively and as shown, the speed circuit 320, the feasibility circuit 322, the efficiency circuit 324, and the notification circuit 326 may be embodied in or within a single unit/housing, which is shown as the controller 140.

In the example shown, the controller 140 includes the processing circuit 302 having the processor 304 and the memory 306. The processing circuit 302 may be structured or configured to execute or implement the instructions, commands, and/or control processes described herein with respect to the speed circuit 320, the feasibility circuit 322, the efficiency circuit 324, and the notification circuit 326. The depicted configuration represents the speed circuit 320, the feasibility circuit 322, the efficiency circuit 324, and the notification circuit 326 as machine or computer-readable media storing instructions. However, as mentioned above, this illustration is not meant to be limiting as the present disclosure contemplates other embodiments where the speed circuit 320, the feasibility circuit 322, the efficiency circuit 324, and the notification circuit 326, or at least one circuit of the speed circuit 320, the feasibility circuit 322, the efficiency circuit 324, and the notification circuit 326, is configured as a hardware unit. All such combinations and variations are intended to fall within the scope of the present disclosure.

The processor 304 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a processor, a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the speed circuit 320, the feasibility circuit 322, the efficiency circuit 324, and the notification circuit 326 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 306 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 306 may be communicably connected to the processor 304 to provide computer code or instructions to the processor 304 for executing at least some of the processes described herein. Moreover, the memory 306 may be or include tangible, non-transient volatile memory or non-volatile memory. Accordingly, the memory 306 may include database components, object code components, script components, or any other type of information structure for supporting the various activities and information structures described herein.

The communications interface 310 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 310 may include an Ethernet card and port for sending and receiving data via an Ethernet-based communications network and/or a Wi-Fi transceiver for communicating via a wireless communications network. The communications interface 310 may be structured to communicate via local area networks or wide area networks (e.g., the Internet) and may use a variety of communications protocols (e.g., IP, LON, Bluetooth, ZigBee, radio, cellular, near field communication). Furthermore, the communications interface 310 may work together or in tandem with the telematics unit 145 in order to communicate with other vehicles (e.g., in the fleet of one or more vehicles 20) or remote computing systems. In other embodiments, the telematics unit 145 may be excluded from the vehicle such that the out-of-vehicle communications with, for example, remote computing system 250 are done via the controller 140 (communications interface 310) itself.

The speed circuit 320 is structured or configured to receive data indicative of operation of the vehicle 100. In particular, the speed circuit 320 is structured to determine a speed of the vehicle (e.g., in miles-per-hour or another metric) (i.e., a "current vehicle speed"). For example, the speed circuit 320 may be communicably coupled to the engine system (e.g., a speed sensor coupled to the engine) to acquire data indicative of a rotational speed of the engine (e.g., in revolutions-per-minute). The data indicative of operation of vehicle 100 may include, but is not limited to, a weight of the vehicle 100, a weight of the load carried by the vehicle 100, a current speed of the vehicle 100, a current torque on the engine 101, a calibration of the engine 101, current fueling levels (i.e., amount of fuel stored and/or amount of fuel being injected into the engine 101), a road grade for a current portion of the route (i.e., the road grade of the road on which the vehicle 100 is currently traveling), a road grade for an upcoming portion of the route, a weather for the current portion and/or the upcoming portion of the route, and/or a presence of other vehicle(s) in the vicinity of the vehicle 100. The vicinity of the vehicle 100 may be an area around the vehicle 100 that is defined by a threshold distance (e.g., a circular area around the vehicle with a radius of 100 feet). These data indicative of operation of vehicle 100 operation may be received from the sensors 150 (e.g., a vehicle speed sensor), from the route look-ahead system 210, the weather system 220, the GPS system 230, or any other relevant internal or external system.

The speed circuit 320 is further configured or structured to determine that a current speed is different than a target speed of the vehicle. The "target speed" for the vehicle refers to a desired travel speed for the vehicle, and may be set by/designated by a driver of the vehicle (e.g., via a cruise control input control), by local laws (e.g., the target speed is equal to a speed limit), and/or by a remote user (e.g., at a fleet command center). For example, if the speed limit is listed as 60 miles-per-hour (mph) and a driver desires to travel at 65 mph based on that speed limit, the target speed of the vehicle may be set to 60 mph (i.e., the speed limit) or to 65 mph (i.e., the driver preference). The fleet command center may set the target speed independently as a third different and unrelated value (e.g., 69 mph) based on a desired arrival time for the vehicle, or may set the target speed based on a global preference for either speed limit or driver preference, such that the fleet command center sets the target speed in all (or substantially all) instances as the local speed limit or as the driver preference speed.

In some embodiments, the determination by the speed circuit 320 that the current speed is different than the target speed is based on a switch from standard cruise control to an adaptive cruise control (ACC). In a standard cruise control system, a target speed for the vehicle 100 is designated and the engine 101 (and/or transmission or other components/systems) is controlled in order to achieve or substantially achieve that target speed for the vehicle 100. ACC is similar in that a target speed for the vehicle 100 is designated and the engine 101 (and/or transmission other components/systems) is controlled in order to achieve or substantially achieve that target speed for the vehicle 100. But, an ACC system utilizes one or more proximity sensors (e.g., part of the sensors 150) to determine a speed of a vehicle in front of the vehicle 100 and sets the speed of that vehicle as the target speed for ACC (or a deviation relative to that speed as the target speed for the vehicle). From there, the ACC system controls the engine 101 (and/or transmission or other components/systems) in order to match or substantially match the speed of the vehicle ahead of the vehicle 100 (or the defined speed deviation relative to the speed ahead of the vehicle). In other arrangements, the ACC system utilizes the one or more proximity sensors to determine a distance from a vehicle in front of the vehicle 100 and sets the distance as a target distance for the vehicle 100. From there, the speed circuit 320 sets a target speed for the vehicle 100 as a speed at which the vehicle 100 maintains the target distance. Because ACC adaptively slows a vehicle below a target cruise control speed in order to, for example, avoid collision, the speed circuit 320 determines that a current speed is below a target speed if the ACC system activates because the ACC only activates when the vehicle 100 needs to slow down from a target speed (i.e., the speed at which the target distance would be maintained) in order to avoid hitting the vehicle in front of the vehicle 100.

In other embodiments, the speed circuit 320 determines that a current speed is below a target speed based on a determination that the current speed is below a received or defined speed limit threshold. The speed limit threshold, in some embodiments, is equal to a speed limit for a current portion of the route, which may be received from one or more external sources (e.g., route look-ahead system, GPS system 230) or may be input by the driver in response to seeing a speed limit sign. In other embodiments, the speed limit threshold is a certain value above or below the speed limit of the current portion (e.g., the speed limit is 55 miles per hour, and the speed limit threshold is 60 miles per hour, etc.)

In further embodiments, the speed circuit 320 determines that a current speed is below a target speed based on a determination that one or more vehicles are within a predefined distance of the vehicle 100. In contrast to the determination made by the ACC system, the speed circuit 320, in these embodiments, determines that a current speed is below a target speed based on an assumption that the presence of other vehicles in relatively close proximity is keeping the vehicle 100 from achieving a target speed or will keep or likely keep the vehicle 100 from maintaining the target speed, regardless of the actual speed(s) of the one or more vehicles. As such, the determination here by the speed circuit 320 that the current speed is below the target speed is not completely based on an actual determination of the target speed (i.e., no numerical value for target speed is calculated) relative to the current speed, but is also based on a distance of one or more other vehicles from the vehicle 100 that are determined to prevent the vehicle from reaching or exceeding the target speed within a predefined amount of distance and/or time. In some embodiments, the determination that the one or more other vehicles are within a predefined distance of the vehicle 100 is based on the one or more other vehicles being within the predefined distance of the vehicle 100 for a predefined period of time (e.g., 10 seconds). For example, even if multiple vehicles are within the pre-defined distance, the speed circuit 320 does not determine that the current speed is below the target speed unless the multiple vehicles stay within the predefined distance for a predefined amount of time (e.g., at least 10 seconds) because the longer the other vehicles stay within relatively close proximity, the more likely it is that the other vehicles are negatively affecting the speed of the vehicle 100.

Furthermore, the speed circuit 320 may determine that the current speed is soon to be, will be, or is otherwise expected to go below the target speed based on the determination that the one or more other vehicles are within a predefined distance (e.g., ahead) of the vehicle 100 and/or within a predefined time of the instant comparison of the current speed to the target speed. For example, here, the current speed may be determined by the speed circuit 320 to be above the target speed. But, the speed circuit 320 may also determine that one or more other vehicles are within the predefined distance of the vehicle 100 for a predefined period of time similar to as described above. The presence of these vehicles may be determined to likely slow the vehicle down within a certain period of time or distance to be below the target speed. The detection and identification of nearby vehicles (or other objects) may be done via a variety of different ways including, but not limited, based on radar, lidar, etc. signals from a sensor that are transmitted by the sensor and returned to the sensor to detect a nearby object, such as another vehicle; based on camera images from an on-board camera or remote monitoring camera (e.g., satellite) that identifies nearby vehicles and the circuit 320 can then determine a distance from the images between the vehicle and the nearby vehicles; another electromagnetic sensing device or system that determines a presence of nearby other vehicles and a distance to those vehicles; and/or, any other type of suitable sensor. In operation and in some embodiments, this determination may be based on another vehicle being within a predefined distance and getting closer to the vehicle 100 over a pre-defined period of time, such that the speed circuit 320 determines that the other vehicle 100 is not only close enough to possibly affect the speed of the vehicle 100 but also going slower than the vehicle (as evidenced by the other vehicle getting closer to the vehicle 100). As such, in this embodiment, the speed circuit 320 is configured to predict that the vehicle 100 will be slowing rather than a determination that the vehicle 100 has slowed. Thus, the rate of the change of the nearby vehicle(s) may be used by the speed circuit 320 to predict a slowing down of the vehicle to be at or below the target speed.

The feasibility circuit 322 is structured or configured to receive an indication from the speed circuit 320 that the current speed is at or below the target speed and to determine whether a lane change and/or takeover event/maneuver for the vehicle 100 is feasible. In some embodiments, a lane change and takeover event for the vehicle is feasible if the event would be successful. A successful lane change and takeover event refers to the vehicle 100 departing from a current lane (i.e., lane on a highway) to a passing lane, increasing a speed of the vehicle 100, and returning to the original lane once the vehicle 100 has passed one or more vehicles or other objects originally in front of the vehicle 100. Alternatively, an unsuccessful lane change and takeover event refers to the vehicle 100 departing from the current lane to a passing lane, attempting to increase a speed of the vehicle 100, but returning the original lane without passing one or more vehicles or other objects in front of the vehicle. An unsuccessful lane change and takeover event may be caused by an insufficient increase in vehicle 100 speed following the lane change, which in turn causes unnecessary fuel consumption due to the excess fuel demanded by the engine 101 to increase vehicle 100 speed without a successful takeover to show for the fuel consumption. As such, the feasibility circuit 322 determines that the lane change and takeover event for the vehicle 100 would be successful based at least in part on a determination that a sufficient increase in vehicle 100 speed is feasible.

In operation, the feasibility circuit 322 determines a maximum speed (or maximum relative increase in speed from the current speed) for the vehicle 100. In some embodiments, the maximum speed may be a maximum speed at which the vehicle 100 is allowed to travel, such that maximum speed is pre-determined (e.g., by a driver via the I/O device 130, by a remote computing system based on local regulations, etc.). For example, the vehicle 100 may include a speed governor that sets a maximum allowable speed for the vehicle. In other embodiments, the maximum speed may be a maximum speed of which the vehicle 100 is capable, such that the maximum speed is based on a current speed, a current and maximum rated load on the engine 101, a weight of the payload on the vehicle 100, a current and upcoming road grade, etc. The maximum load on the engine 101 may be based on the calibration of the engine 101, such that the calibration establishes maximum torque at different speeds, where different calibrations set different limits on a torque output from the engine. Using the maximum engine 101 load, the payload weight, and the upcoming road grade, the feasibility circuit 322 determines a maximum speed for the vehicle. In some embodiments, the maximum speed is determined based on one or more formulas that utilize the engine 101 load, payload weight, and road grade, while in other embodiments, the maximum speed is determined based on a lookup table. In yet further embodiments, the maximum speed is determined based on an extrapolation of the current speed that corresponds to a current engine 101 load and current road grade to a maximum speed that corresponds to a maximum engine 101 load and upcoming road grade. For example, the feasibility circuit 322 can determine a maximum vehicle 100 speed based on a current engine 101 load and upcoming road grade for the vehicle (and, in some embodiments, other parameters). In this way, the feasibility circuit 322 may store one or more tables (or, algorithms, models, formulas, etc.) that correlate various vehicle operating parameters (e.g., current vehicle speed, vehicle weight, road grade, etc.) to a maximum capable speed of the vehicle to determine how much the vehicle speed can be increased. Additionally, the tables may include a determination of how fast it will take the vehicle 100 to reach that maximum speed (or another elevated speed relative to the current vehicle speed). This information can be used by the feasibility circuit to determine if a takeover event may be successful.

The feasibility circuit 322 then determines a takeover speed that would be necessary or likely necessary for a successful lane change and takeover event. The takeover speed is based on a speed (or speeds) of one or more vehicles in front of the vehicle 100. In some embodiments, the takeover speed is a pre-defined amount above the current speed (or speeds) of the one or more vehicles, such that the takeover speed is high enough to outpace the one or more vehicles. In other embodiments, the takeover speed is a pre-defined amount above an adjusted speed (or speeds) of the one or more vehicles, where the adjusted speed is based on environmental factors and is similar to the determination of the maximum speed for the vehicle 100. For example, if the upcoming road grade is downhill, the adjusted speed is higher than the current speed in order to account for the likely increase to speed for the one or more vehicles in front from the downhill travel. In either embodiment, the pre-defined amount above may be a flat amount (e.g., 5 miles per hour) or a percentage value (e.g., 10%).

In some embodiments, the feasibility circuit 322 further determines the takeover speed based on an available passing distance. The available passing distance is defined as a length of road during which a lane change and takeover event is possible/can be performed. The length of road in which a takeover event can be performed may be defined in a variety of ways. In one embodiment, the available passing distance may be a distance until a curve in the road (as the slowdown required to traverse a curve would preclude a takeover event) beyond a predefined curvature amount (e.g., slight curves are ok, but hairpin curves signify an end to the available passing distance). In another embodiment, the available passing distance may be a distance until an end of a passing lane (such as a temporary passing lane that some single-lane highways feature). This information may be received by the controller 140 from a GPS to determine when certain features start/end (e.g., when passing lanes end, when a curvature of a road beyond a threshold amount occurs, etc.). From there, the feasibility circuit 322 applies the available passing distance to the takeover speed determination, with greater available passing distances begetting lower takeover speeds and lesser available passing distances begetting higher takeover speeds. Because the takeover speed is a speed at which the lane change and takeover event would be successful, the more distance that the vehicle 100 has in which to execute the lane change and takeover event, the lower the speed at which the vehicle 100 must travel to pass the vehicle(s)/objects in front of the vehicle 100. Alternatively, the less distance that the vehicle 100 has in which to execute the lane change and takeover event, the greater the speed at which the vehicle 100 must travel to pass the vehicle in front, as the vehicle 100 has a smaller window in which the lane change and takeover event would be successful.

Based on a comparison of the vehicle 100 maximum speed and the takeover speed, the feasibility circuit 322 determines whether a lane change and takeover event would be successful. In some embodiments, if the maximum speed is greater than or equal to the speed necessary, the feasibility circuit 322 determines that the lane change and takeover event would be successful. If the maximum speed is less than the speed necessary, the feasibility circuit 322 determines that the lane change and takeover event would not be successful. For example, based on a current speed of 65 miles per hour, an upcoming grade of 2% uphill, and a payload weight of 40 tons (determined based on a mass sensor onboard or by a weight station), the feasibility circuit 322 determines the maximum (capable) speed for the vehicle during a lane change and takeover event to be 55 miles per hour. If the speed of the vehicle in front of the vehicle 100 is 60 miles per hour, the feasibility circuit 322 determines the takeover speed for a successful lane change and takeover event to be 65 miles per hour, which may be based on a flat increase of 5 miles per hour or based on a relatively long available passing distance. Because the vehicle 100 maximum speed is less than the speed necessary, the feasibility circuit 322 determines that a lane change and takeover event would not be successful, despite the current speed of the vehicle 100 exceeding the speed of the vehicle in front.

Alternatively, if the maximum speed is greater than the speed necessary, the feasibility circuit 322 determines that the lane change and takeover event would be successful. For example, based on a current speed of 65 miles per hour, an upcoming grade of 2% downhill, and a payload weight of 40 tons (determined based on a mass sensor onboard or by a weight station), the feasibility circuit 322 determines the maximum (capable) speed for the vehicle during a lane change and takeover event to be 75 miles per hour. If the speed of the vehicle in front of the vehicle 100 is 60 miles per hour, the feasibility circuit 322 determines the takeover speed for a successful lane change and takeover event to be 70 miles per hour, which may be based on a flat increase of 10 miles per hour or on a relatively short available passing distance. Because the vehicle 100 maximum speed is less than the speed necessary, the feasibility circuit 322 determines that a lane change and takeover event would be successful, due in large part to the downhill slope.

If the feasibility circuit 322 determines that a lane change and takeover event for the vehicle 100 would be feasible, the feasibility circuit 322 determines if the event could be successful without exceeding a pre-defined objective (e.g., goal, etc.). The pre-defined objective may be an amount of emissions, an amount of smoke generation, an amount of noise (e.g., from the engine 101), an amount of fuel consumption, etc. The pre-defined objective may be set by a driver or by a remote third party (e.g., a fleet operator) via the communications interface 310. Regarding the amount of emissions, in some jurisdictions, a limit is placed on the amount of emissions (e.g., NOx) that can be produced by a vehicle 100 during operation. While the vehicle 100 is structured to keep emissions as low as possible (e.g., via the aftertreatment system), a successful lane change and takeover event often requires a relative spike (i.e., a rapid increase) in speed, which corresponds with a relative spike in emissions due to the engine 101 working harder and hotter to increase the vehicle 100 speed. As such, even if the vehicle 100 is operating within required emission guidelines, the vehicle 100 can quickly exceed the guidelines during a lane change and takeover event if not monitored.

In some of these embodiments in which emissions are considered, the feasibility circuit 322 determines whether a successful lane change and takeover event would cause the vehicle 100 to exceed emissions requirements. This determination is based on the maximum speed or takeover speed for a successful lane change and takeover event, and the corresponding engine 101 load for that speed. The feasibility circuit 322 can determine an amount of emissions that corresponds with the engine 101 load for the successful lane change and takeover event. In some embodiments, this determination may be based on a look-up table(s) that associates at least one of the takeover speed, vehicle 100 load, aftertreatment system 121 temperature, fueling quantity, or available takeover distance with an amount and quality (e.g., NOx, Hydrocarbons, particulate matter, etc.) of emissions. In other embodiments, the amount of emissions may be determined according to a formula that takes as inputs at least one of the takeover speed, vehicle 100 load, aftertreatment system 121 temperature, fueling quantity, or available takeover distance and outputs an amount of emissions. The feasibility circuit 322 then compares the determined amount of emissions for the successful lane change and takeover event to an emissions threshold, which may be based on emissions regulations. If the amount of emissions for the successful lane change and takeover event exceeds the emissions threshold, the feasibility circuit 322 determines that the lane change and takeover event is not feasible. However, because this determination is separate from the determination of whether the lane change and takeover event would be successful, the feasibility circuit 322 is able to make a complete feasibility determination without regard for emissions if desired (e.g., vehicle 100 is operating in an area with less stringent emissions regulations, etc.).

In other of these embodiments in which emissions are considered, the feasibility circuit 322 utilizes the emissions threshold as an input for the determination of a maximum speed for vehicle, such that the emissions considerations are included in the determination of whether the lane change and takeover event is successful rather than being a separate determination. In particular, the emissions threshold may inform a maximum load on the engine 101 for the maximum speed determination, such that the maximum load on the engine 101 is not an overall maximum load (i.e., based on engine 101 specifications) but is a maximum load on the engine 101 that would not cause the engine 101 to produce emissions above the emissions threshold. As such, when the feasibility circuit 322 determines that a lane change and takeover event would be successful while taking emissions into consideration, the feasibility circuit 322 is simultaneously determining that a maximum speed of the vehicle 100 is sufficient for the lane change and takeover event and that the vehicle 100 will not exceed an emissions threshold during the successful lane change and takeover event.

The efficiency circuit 324 is configured or structured to receive an indication from the feasibility circuit 322 that a lane change and takeover event is feasible (i.e., successful and/or possible within emissions regulations) and to determine whether the lane change and takeover event would be efficient. In one embodiment, the "efficiency" refers to a fuel consumption rate during the lane change and takeover event. Accordingly, the determination of efficiency is based on whether the lane change and takeover event would have better fuel-consumption (i.e., use less fuel) than the pre-defined fuel consumption rate if the lane change and takeover event were to be delayed. The efficiency circuit 324 determines whether a delay would be efficient based on a comparison of current conditions to upcoming conditions. If upcoming conditions are more conducive to a lane change and takeover event than current conditions, the efficiency circuit 324 determines that a delay would be efficient. For example, if the current road grade is flat but will be downhill in a certain distance (e.g., one mile), the efficiency circuit 324 may determine that a delay would be more efficient due to a lane change and takeover event being more fuel-efficient when performed during a period of downhill slope. As such, the determination of efficiency may be based on a comparison between fuel consumption for an immediate lane change and takeover event and fuel consumption for a delayed lane change and takeover event. In other embodiments, the determination of efficiency is based on a comparison between a fuel consumption for a lane change and takeover event (either immediate or delayed) and a fuel consumption threshold, such that the efficiency circuit 324 determines that a lane change and takeover event (either immediate or delayed) can be successful without exceeding a threshold value for fuel consumption.

In some embodiments, the efficiency circuit 324 receives vehicle-to-vehicle (V2V) or vehicle-to-everything (V2X) information (i.e., via the telematics unit 145 or directly via the controller 140) and uses the V2V or V2X information to make the efficiency determination. In particular, the efficiency circuit 324 may utilize information about another vehicle's route in order to determine if it would be more fuel-efficient for the vehicle 100 to initiate a lane change and takeover event, or for the vehicle 100 to indefinitely delay a lane change and takeover event. For example, if the V2V route information indicates that the vehicle in front is going to be exiting the highway in a mile, the efficiency circuit 324 determines that it would be more fuel-efficient to delay a lane change and takeover event indefinitely, as the slower vehicle in front will soon be out of the way entirely. The V2V information may also include fueling information from other similarly situated (i.e., similar load, engine characteristics) along the same route, such that the efficiency circuit 324 can determine where these other similarly situated vehicles got improved (or worsened) fuel consumption. Based on that determination, the efficiency circuit 324 may delay a lane change and takeover event. For example, if the feasibility circuit 322 indicates a range or distance during which a lane change and takeover event is feasible, the efficiency circuit 324 can receive V2V information regarding fuel consumption of similarly situated vehicles during that indicated range, and determine that the lane change and takeover event would be most efficient at that location within the indicated range at which the similarly situated vehicles were most efficient.

The notification circuit 326 is structured or configured to receive an indication from the feasibility circuit 322 regarding the feasibility of a lane change and takeover event and/or an indication from the feasibility circuit 322 regarding the efficiency of a lane change and takeover event and to provide a notification based on the one or more indications. In some embodiments in which the controller 140 is part of an autonomous driving system, the notification is an internal indication within the autonomous driving system and may further include a visual notification to a passenger or 'driver.' In other embodiments in which the vehicle 100 is actively driven by a driver, the notification may be a visual indication, such as an indicator lamp on a dashboard, a spelled-out notice on the I/O device 130, or an indicator on a heads-up display (HUD) projected onto the windshield, or may be an audio indication, such as a tone or recording played over an in-cabin speaker system. The notification may also be a haptic indication, such that a component of the vehicle 100 (e.g., a steering wheel, driver's seat, etc.) vibrates or otherwise moves as an indication to the driver.

The notification circuit 326 determines the notification based on the indication(s) from the feasibility circuit 322 and/or the efficiency circuit 324. For example, if the feasibility circuit 322 determines that the lane change and takeover event is feasible, the notification circuit 326 provides a notification to the driver that the driver would be able to successfully initiate a lane change and takeover event at this moment. This notification may be a green light on the dashboard, or may be a message (e.g., 'lane change and takeover is feasible') on the I/O device 130 (e.g., heads-up display). However, if the efficiency circuit 324 determines that a lane change and takeover would be more fuel-efficient if delayed, the notification circuit 326 includes that determination with the notification, (e.g., the green light on the dashboard is blinking, the message states 'lane change and takeover is feasible but more efficient in 1 mile,' etc.)

In some embodiments, the notification circuit 326 provides a dynamic notification to the user based on the outputs from the feasibility circuit 322 and/or the efficiency circuit 324. These dynamic notifications may include different colors for indicator lamps (e.g., 'green' to initiate lane change event now, 'yellow' to delay lane change event, and 'red' to stay in lane), different locations for the indicator lamps (e.g., based on a direction in which the lane change would be feasible), or different locations for the haptic indication (e.g., left side of seat would vibrate for a lane change event to the left, etc.). For example, in the HUD or I/O device 130, the notification circuit 326 may provide a dynamic visual representation for a delayed lane change and takeover event, such that the indication changes (e.g., moves along the display) as the vehicle 100 approaches the location at which the lane change and takeover event would be efficient.

In some embodiments, the notification circuit 326 is running continuously or substantially continuously, such that the notification circuit 326 provides notifications to the driver (or autonomous driving system) throughout vehicle 100 operation. In other embodiments, the notification circuit 326 runs when requested, such that the notification circuit 326 provides notifications (i.e., responses) to the driver when requested. For example, the driver may request (via the I/O device 130) a determination of whether a lane change and takeover event would be feasible or efficient, and the notification circuit 326 provides a notification in response.

In some embodiments, the controller 140 assists in the lane change and takeover event via the ADS embodied in the system 10. The amount of assistance the controller 140 provides is based on the level of automation of the ADS. For example, if the ADS is level 3 or above, the controller 140 may command the ADS to perform the lane change and takeover event based on output from the feasibility circuit 322 and/or the efficiency circuit 324. In other example in which the ADS is level 2 or below, the controller 140 may command the ADS to adjust various characteristics of vehicle 100 operation (e.g., adjust an amount of fueling) in order to improve the lane change and takeover event. In this way, the ADS may reduce the amount of lag for the vehicle 100 to reach the desired takeover speed, thereby improving the timing of the lane change and takeover event.

Figure 4:
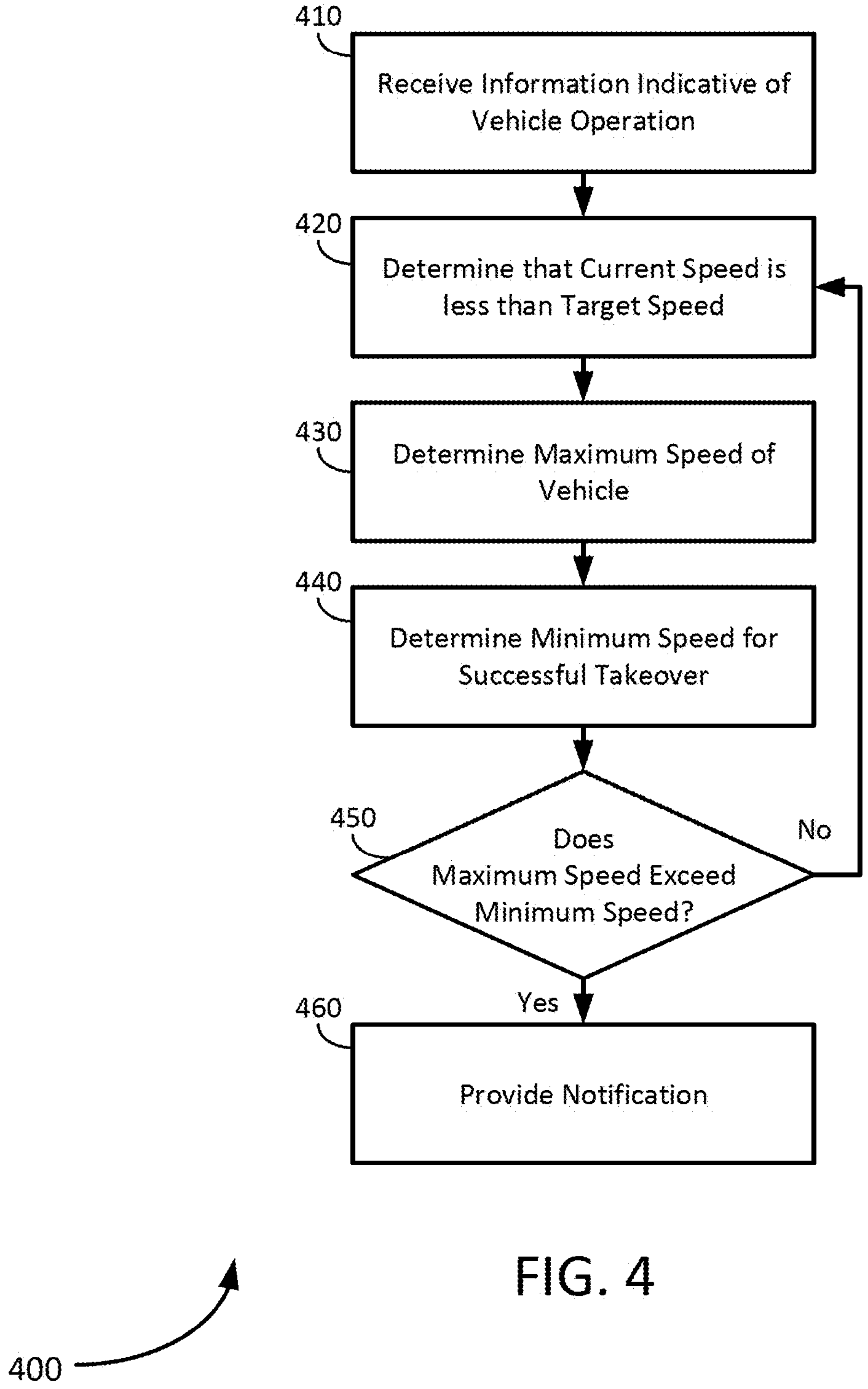
FIG. 4 is a flow diagram of a method of evaluating the feasibility of a lane change and takeover event for a vehicle of the system of FIG. 1, according to an example embodiment.

FIG. 4 is a flow diagram of a method 400 of evaluating the feasibility of a lane change and takeover event for the vehicle 100, according to an exemplary embodiment. As shown in FIG. 4, the method 400 may be performed by the controller 140, and begins at step 410 where the controller 140 receives information indicative of vehicle 100 operation. This information may include a weight of the vehicle 100, a weight of the load carried by the vehicle 100, a current speed of the vehicle 100, a current torque on the engine 101, a calibration of the engine 101, current fueling levels (i.e., amount of fuel stored and/or amount of fuel being injected into the engine 101), a road grade for a current portion of the route (i.e., the road grade of the road on which the vehicle 100 is currently traveling), a road grade for an upcoming portion of the route, a weather for the current portion and/or the upcoming portion of the route, a presence of other vehicle(s) in the vicinity of the vehicle 100, a combination thereof, and so on. From there, the controller 140 determines a current speed for the vehicle 100 (if not directly included in the received information) and a target speed for the vehicle 100. Once the current speed and target speed have been determined, the controller 140 determines at 420 that the current speed is less than the target speed.

The method 400 then proceeds to 430, where the controller 140 determines a maximum speed of the vehicle 100. As discussed above, the maximum speed may be a maximum capable speed based on the capabilities of the vehicle 100 or a maximum allowable speed based on a speed governor. From there, the controller 140 determines a minimum takeover speed for a successful lane change and takeover event. The takeover speed is based on a speed (or speeds) of one or more vehicles in front of the vehicle 100. In some embodiments, the takeover speed is a pre-defined amount above the current speed (or speeds) of the one or more vehicles, such that the takeover speed is high enough to outpace the one or more vehicles.

Once the maximum and minimum speeds have been determined, the controller 140 compares to two to determine if the maximum speed exceeds the minimum speed at 450. If the maximum speed is less than the minimum speed (450: NO), the controller 140 determines that a lane change and takeover event would not be feasible, and the method 400 returns to 420. If the maximum speed is greater than the minimum speed (450: YES), the controller 140 determines that a lane change and takeover event would be feasible, and the method 400 proceeds to 460. At 460, the controller 140 provides a notification to the driver that a lane change and takeover event is feasible and would be successful if performed at this time.

Figure 5:
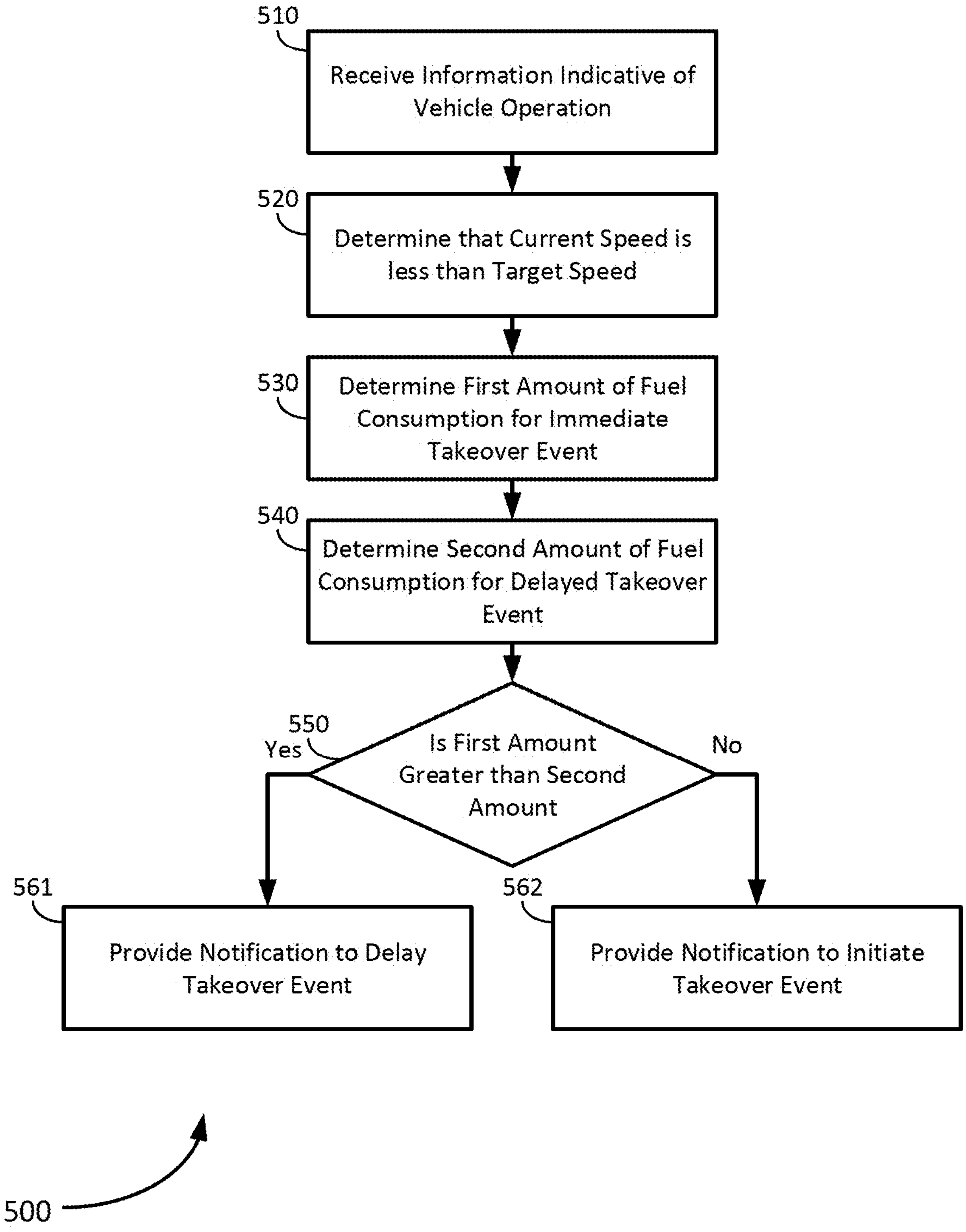
FIG. 5 is a flow diagram of a method of evaluating the efficiency of a lane change and takeover event for a vehicle of the system of FIG. 1, according to an example embodiment.

FIG. 5 is a flow diagram of a method of evaluating the efficiency of a lane change and takeover event for the vehicle 100, according to an exemplary embodiment. As shown in FIG. 4, the method 500 may be performed by one or more circuits of the controller 140, and begins at step 510 where the controller 140 receives information indicative of vehicle 100 operation. This information may include a weight of the vehicle 100, a weight of the load carried by the vehicle 100, a current speed of the vehicle 100, a current torque on the engine 101, a calibration of the engine 101, current fueling levels (i.e., amount of fuel stored and/or amount of fuel being injected into the engine 101), a road grade for a current portion of the route (i.e., the road grade of the road on which the vehicle 100 is currently traveling), a road grade for an upcoming portion of the route, a weather for the current portion and/or the upcoming portion of the route, a presence of other vehicle(s) in the vicinity of the vehicle 100, a combination thereof, and so on. From there, the controller 140 determines a current speed for the vehicle 100 (if not directly included in the received information) and a target speed for the vehicle 100. Once the current speed and target speed have been determined, the controller 140 determines at 520 that the current speed is less than the target speed.

From there, the controller 140 determines a first amount of fuel at 530 that would be consumed if a lane change and takeover event were to be performed immediately (or substantially immediately; i.e., within a relatively small amount of time, such as 5 seconds). At 540, the controller 140 determines a second amount of fuel that would be consumed if a lane change and takeover event were to be performed at a later time. The later time may be a fixed amount of time (e.g., 1 minute) or based on a fixed amount of distance (e.g., 1 mile). In some embodiments, the controller 140 determines an amount of fuel that would be consumed by a lane change and takeover event at several different occasions in the future (e.g., in 1 minute, 2 minutes, 3 minutes, etc.), and determines the second amount of fuel to be the lowest amount of fuel consumed in the several different occasions.

Once the first and second amounts have been determined, the controller 140 determines which amount is less at 550. If the second amount of fuel is less (550: YES), the method 500 proceeds to provide a notification to the driver at 561 that the takeover event would be more fuel-efficient if delayed. If the first amount of fuel is less (550: NO), the method 500 proceeds to provide a notification to the driver at 562 that the takeover event would be more fuel-efficient if performed substantially immediately.

Figure 6:
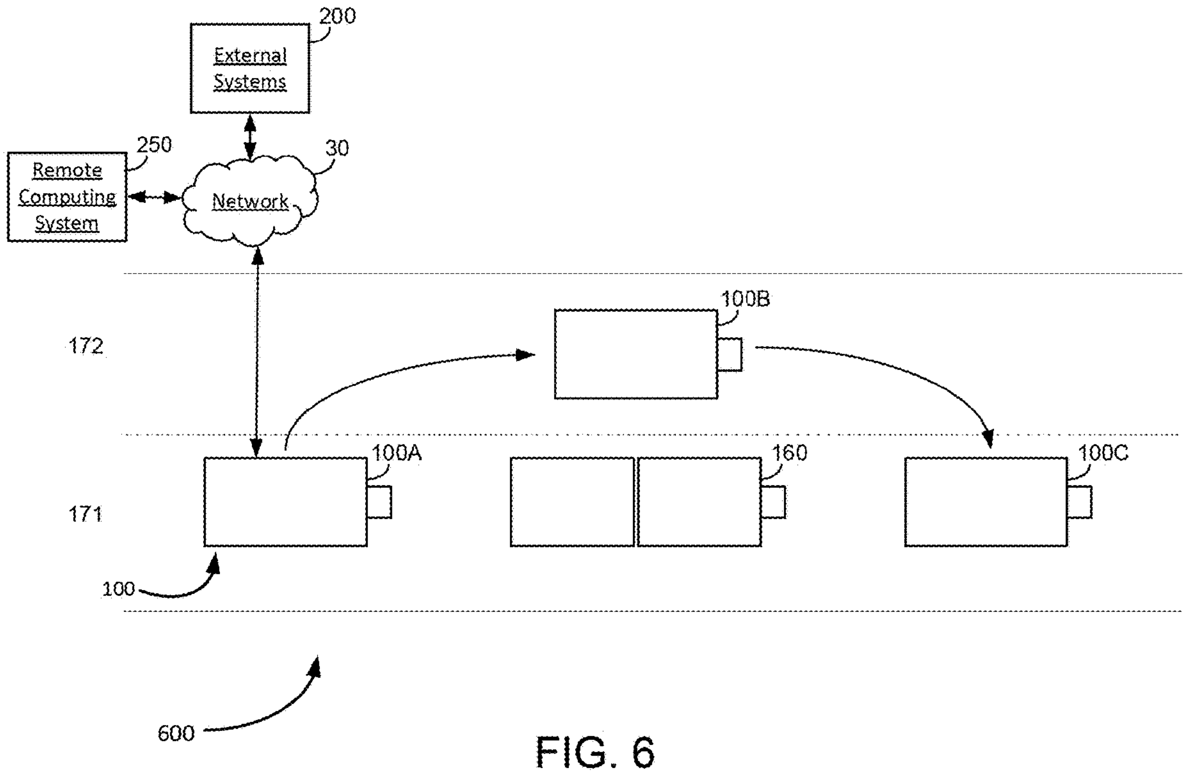
FIG. 6 is a schematic diagram of a vehicle of the system of FIG. 1 executing a successful lane change and takeover event, according to an example embodiment.

FIG. 6 is a schematic diagram 600 of the vehicle 100 executing a successful lane change and takeover event. As shown in FIG. 6, the vehicle 100 is in communication with external systems 200 and the remote computing system 250 via the network 30. At point 100A, the vehicle 100 is in a driving lane 171 behind a slower vehicle 160. Based on information from the external systems 200 and the remote computing system 250, the controller 140 onboard the vehicle 100 determines that a lane change and takeover event would be successful and provides a notification to the driver of the vehicle 100 accordingly. In response to that notification, the driver initiates a lane change event, driving the vehicle 100 into a passing lane 172 at point 100B. From there, the vehicle 100 passes the slower vehicle 160 and returns to the driving lane 171.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIGS. 3, it should be understood that the controller 140 may include any number of circuits for completing the functions described herein. For example, the activities and functionalities of the speed circuit 320, the feasibility circuit 322, the efficiency circuit 324, and the notification circuit 326 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 304 of FIG. 3. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A method, comprising:

receiving, by a controller, information indicative of operation of a vehicle and of a driving condition for the vehicle;

determining, by the controller based on the received information, a slowdown event caused by one or more vehicles ahead of the vehicle being within a predefined distance of the vehicle for at least a predefined time period;

determining, by the controller, in response to the determination of the slowdown event, that a takeover event is feasible based on at least (i) the received information comprising a maximum speed for the vehicle and (ii) a minimum speed for the takeover event according to a speed of the one or more vehicles; and initiating, by the controller, the takeover event in response to the determination that the takeover event is feasible.

2. The method of claim 1, wherein the information indicative of operation of the vehicle and of the driving condition for the vehicle comprises at least one of a current speed of the vehicle, a set cruise control speed for the vehicle, a weight of the vehicle, a current load on the vehicle, a current road grade, or an upcoming road grade.

3. The method of claim 1, wherein the determination that the takeover event is feasible further comprises:

determining, by the controller, that the maximum speed for the vehicle exceeds the minimum speed.

4. The method of claim 3, wherein the determination of the maximum speed for the vehicle is based on a maximum load on an engine of the vehicle and an upcoming road grade.

5. The method of claim 4, wherein a value for the maximum load on the engine is based on an emissions threshold, the value being an engine load amount corresponding to an emissions characteristic being at or under an associated emissions characteristic threshold.

6. The method of claim 1, further comprising providing, by the controller, a notification to a user regarding initiating the takeover event.

7. The method of claim 6, wherein the notification comprises at least one of a visual indication or an audio indication to the user of the vehicle regarding initiating the takeover event.

8. The method of claim 1, wherein the initiation of the takeover event comprises sending, by the controller, a command to adjust a speed of the vehicle.

9. A method, comprising:

receiving, by a controller, information indicative of operation of a vehicle and of a driving condition for the vehicle;

determining, by the controller based on the received information, a slowdown event caused by one or more vehicles ahead of the vehicle being within a predefined distance of the vehicle for at least a predefined time period;

determining, by the controller, in response to the determination of the slowdown event, that a takeover event is efficient based on the received information comprising at least (i) an indication of a first amount of fuel consumption for the takeover event that is initiated substantially immediately and (ii) an indication of a second amount of fuel consumption for the takeover event that is initiated after a predefined delay; and initiating, by the controller, the takeover event in response to the determination that the takeover event is efficient.

10. The method of claim 9, wherein the information indicative of operation of the vehicle and of the driving condition for the vehicle comprises at least one of a current speed of the vehicle, a cruise control speed for the vehicle, a weight of the vehicle, a current load on an engine of the vehicle, a maximum load on the engine, a current road grade, or an upcoming road grade.

11. The method of claim 9, wherein the determination that the takeover event is efficient further comprises:

comparing, by the controller, the first amount of fuel consumption to the second amount of fuel consumption.

12. The method of claim 11, further comprising:

delaying, by the controller, the initiation of the takeover event based on the first amount of fuel consumption being greater than the second amount of fuel consumption.

13. The method of claim 9, further comprising providing, by the controller, a notification to a user indicating the initiation of the takeover event.

14. The method of claim 13, wherein the notification comprises at least one of a visual indication or an audio indication to the user of the vehicle regarding the takeover event.

15. A system, comprising:

a controller comprising at least one processor coupled to a memory storing instructions that, when executed by the at least one processor, cause the controller to perform operations comprising:

receiving information indicative of operation of a vehicle and of a driving condition for the vehicle;

determining, based on the received information, a slowdown event caused by one or more vehicles ahead of the vehicle being within a predefined distance of the vehicle for at least a predefined time period;

determining, in response to the determination of the slowdown event, that a takeover event is feasible or efficient based on at least one of:

(a) a comparison of the received information comprising (i) a maximum speed for the vehicle and (ii) a minimum speed for the takeover event according to a speed of the one or more vehicles, or (b) a comparison of the received information comprising at least (i) an indication of a first amount of fuel consumption for the takeover event that is initiated after a predefined delay and (ii) an indication of a second amount of fuel consumption for the takeover event that is initiated substantially immediately; and initiating, in response to the determination that the takeover event is feasible or efficient, the takeover event.

16. The system of claim 15, wherein the determination that the takeover event is feasible further comprises:

determining the maximum speed for the vehicle;

determining the minimum speed for the takeover event to be successful; and determining that the maximum speed for the vehicle exceeds the minimum speed.

17. The system of claim 15, wherein the determination that the takeover event is efficient further comprises:

determining the first amount of fuel consumption for the takeover event that is initiated after a delay;

determining the second amount of fuel consumption for the takeover event that is initiated substantially immediately;

comparing the first amount of fuel consumption to the second amount of fuel consumption; and delaying, in response to the comparison, the takeover event based on the first amount of fuel consumption being less than the second amount of fuel consumption.

* * * * *